US010289184B2

(12) United States Patent
Malik et al.

(10) Patent No.: US 10,289,184 B2
(45) Date of Patent: *May 14, 2019

(54) METHODS OF ACHIEVING COGNIZANT POWER MANAGEMENT

(71) Applicant: Sunbird Software, Inc., Somerset, NJ (US)

(72) Inventors: Naim R. Malik, Somerset, NJ (US); Christian Paetz, Zwickau (DE); Neil Weinstock, Randolph, NJ (US); Allen Yang, Bridgewater, NJ (US); Vsevolod Onyshkevych, Princeton, NJ (US); Siva Somasundaram, Dayton, NJ (US)

(73) Assignee: Sunbird Software, Inc., Somerset, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,621

(22) Filed: Oct. 7, 2015

(65) Prior Publication Data

US 2016/0252946 A1 Sep. 1, 2016

Related U.S. Application Data

(63) Continuation of application No. 13/790,601, filed on Mar. 8, 2013, now abandoned, which is a
(Continued)

(51) Int. Cl.
*G06F 1/32* (2019.01)
*G06F 9/50* (2006.01)
(Continued)

(52) U.S. Cl.
CPC .............. *G06F 1/3209* (2013.01); *G06F 1/26* (2013.01); *G06F 1/3203* (2013.01); *G06F 1/324* (2013.01); *G06F 1/3296* (2013.01); *G06F 9/5094* (2013.01)

(58) Field of Classification Search
CPC ........ G06F 1/26; G06F 1/3203; G06F 1/3209; G06F 1/324; G06F 1/3296; G06F 9/5094
See application file for complete search history.

(56) References Cited

U.S. PATENT DOCUMENTS 4,321,582 A 3/1982 Banghart
4,543,649 A 9/1985 Head et al.
(Continued)

FOREIGN PATENT DOCUMENTS

CN 204613978 U 9/2015
EP 0766098 4/1997
(Continued)

OTHER PUBLICATIONS

The International Search Report & Written Opinion, dated Aug. 7, 2008 in PCT/US08/05533. (Previously submitted in U.S. Appl. No. 12/044,530.).
(Continued)

*Primary Examiner* — Abdelmoniem I Elamin
(74) *Attorney, Agent, or Firm* — Thomas J. Bean; Vincent E. McGeary; Kenneth Ottesen (57) ABSTRACT

A system and method of increasing the efficiency of overall power utilization in data centers by integrating a power management approach based on a comprehensive, dynamic model of the data center created with integrated environmental and computational power monitoring to correlate power usage with different configurations of business services utilization, with the techniques of CPU level power management.

9 Claims, 4 Drawing Sheets

Related U.S. Application Data continuation of application No. 12/603,322, filed on Oct. 21, 2009, now Pat. No. 8,429,431, which is a continuation-in-part of application No. 12/044,530, filed on Mar. 7, 2008, now Pat. No. 8,671,294.

(60) Provisional application No. 61/107,172, filed on Oct. 21, 2008.

(51) Int. Cl.

| | | |
|---|---|---|
| G06F 1/3209 | (2019.01) | |
| G06F 1/3203 | (2019.01) | |
| G06F 1/26 | (2006.01) | |
| G06F 1/324 | (2019.01) | |
| G06F 1/3296 | (2019.01) | |

(56) References Cited

U.S. PATENT DOCUMENTS

| | | |
|---|---|---|
| 4,955,821 A | 9/1990 | Bemardini |
| 5,515,853 A | 5/1996 | Smith et al. |
| 5,719,800 A | 2/1998 | Mittal et al. |
| 5,964,879 A | 10/1999 | Dunstan et al. |
| 6,167,330 A | 12/2000 | Linderman |
| 6,229,899 B1 | 5/2001 | Norris et al. |
| 6,413,104 B1 | 7/2002 | Bemardini |
| 6,476,728 B1 | 11/2002 | Sakakibara |
| 6,499,102 B1 | 12/2002 | Ewertz |
| 6,553,013 B1 | 4/2003 | Jones et al. |
| 6,553,336 B1 | 4/2003 | Johnson et al. |
| 6,567,769 B2 | 5/2003 | Chang |
| 6,697,300 B1 | 2/2004 | Holt |
| 6,983,210 B2 | 1/2006 | Matsubayashi et al. |
| 6,985,697 B2 | 1/2006 | Smith et al. |
| 6,986,069 B2 | 1/2006 | Oehler et al. |
| 7,032,119 B2 | 4/2006 | Fung |
| 7,057,557 B2 | 6/2006 | Lee |
| 7,248,978 B2 | 7/2007 | Ransom |
| 7,272,735 B2 | 9/2007 | Fung |
| 7,295,556 B2 | 11/2007 | Roese et al. |
| 7,444,526 B2 | 10/2008 | Felter et al. |
| 7,552,350 B2 | 6/2009 | Fung |
| 7,561,411 B2 | 7/2009 | Johnson, Jr. |
| 7,802,120 B2 | 9/2010 | Conroy et al. |
| 7,853,816 B2 | 12/2010 | Tanaka |
| 8,429,431 B2 | 4/2013 | Malik |
| 8,610,438 B1 | 12/2013 | Sykora et al. |
| 8,790,184 B2 | 7/2014 | Kruglick |
| 8,854,822 B2 | 10/2014 | Hazzard et al. |
| 8,917,513 B1 | 12/2014 | Hazzard |
| 8,924,548 B2 | 12/2014 | Frost et al. |
| 8,938,634 B2 | 1/2015 | Kruglick |
| 8,964,360 B2 | 2/2015 | Trout |
| 9,183,019 B2 | 11/2015 | Kruglick |
| 9,185,824 B2 | 11/2015 | Nordin et al. |
| 9,207,963 B2 | 12/2015 | Kruglick |
| 9,218,662 B1 | 12/2015 | Feder et al. |
| 9,337,555 B2 | 5/2016 | Pierce et al. |
| 9,367,422 B2 | 6/2016 | Mankovskii et al. |
| 9,405,569 B2 | 8/2016 | Greden et al. |
| 9,448,841 B2 | 9/2016 | Greden et al. |
| 9,448,848 B2 | 9/2016 | Gilbert et al. |
| 9,454,501 B2 | 9/2016 | Dearing et al. |
| 9,460,118 B2 | 10/2016 | Feder et al. |
| 9,461,709 B2 | 10/2016 | Griffith et al. |
| 9,463,574 B2 | 10/2016 | Purkayastha et al. |
| 9,514,252 B2 | 12/2016 | van den Berghe |
| 9,537,879 B2 | 1/2017 | Blackwell |
| 9,568,923 B1 | 2/2017 | Demetriou et al. |
| 9,572,276 B2 | 2/2017 | Haroun |
| 9,632,835 B2 | 4/2017 | Greden et al. |
| 9,642,112 B2 | 5/2017 | Costa |
| 9,661,016 B2 | 5/2017 | Khuti et al. |
| 9,674,445 B2 | 6/2017 | Park et al. |
| 9,680,716 B2 | 6/2017 | Khuti et al. |
| 9,715,222 B2 | 7/2017 | Zimmermann et al. |
| 9,727,515 B2 | 8/2017 | Whitney |
| 9,746,911 B2 | 8/2017 | Rallo et al. |
| 9,769,254 B2 | 9/2017 | Gilbert et al. |
| 9,784,460 B2 | 10/2017 | Magcale et al. |
| 9,813,478 B2 | 11/2017 | Koo et al. |
| 9,814,160 B2 | 11/2017 | Slessman et al. |
| 9,851,726 B2 | 12/2017 | Ibrahim et al. |
| 9,870,773 B2 | 1/2018 | German et al. |
| 9,943,011 B2 | 4/2018 | Shrivastava et al. |
| 2002/0007463 A1 | 1/2002 | Fung |
| 2002/0156600 A1 | 10/2002 | Chang |
| 2003/0124999 A1 | 7/2003 | Parssinen et al. |
| 2003/0193777 A1 | 10/2003 | Friedrich et al. |
| 2003/0204759 A1 | 10/2003 | Singh |
| 2004/0003303 A1 | 1/2004 | Oehler et al. |
| 2004/0051397 A1 | 3/2004 | Juntunen et al. |
| 2004/0064745 A1 | 4/2004 | Kadambi |
| 2004/0163001 A1 | 8/2004 | Bodas |
| 2004/0167732 A1 | 8/2004 | Spitaels et al. |
| 2004/0267897 A1 | 12/2004 | Hill et al. |
| 2005/0102539 A1 | 5/2005 | Klepner et al. |
| 2005/0143865 A1 | 6/2005 | Gardner |
| 2005/0223090 A1 | 10/2005 | Ewing et al. |
| 2005/0283624 A1 | 12/2005 | Kumar et al. |
| 2006/0005057 A1 | 1/2006 | Nalawadi et al. |
| 2006/0013070 A1 | 1/2006 | Holm et al. |
| 2006/0072271 A1 | 4/2006 | Jones et al. |
| 2006/0085854 A1 | 4/2006 | Agrawal |
| 2006/0103504 A1 | 5/2006 | Vassallo |
| 2006/0112286 A1 | 5/2006 | Whalley et al. |
| 2006/0168975 A1 | 8/2006 | Malone et al. |
| 2006/0171538 A1 | 8/2006 | Larson et al. |
| 2006/0184935 A1 | 8/2006 | Abels et al. |
| 2006/0184936 A1 | 8/2006 | Abels et al. |
| 2006/0184937 A1 | 8/2006 | Abels et al. |
| 2006/0259621 A1 | 11/2006 | Ranganathan et al. |
| 2006/0265192 A1 | 11/2006 | Turicchi |
| 2006/0288241 A1 | 12/2006 | Felter et al. |
| 2007/0010916 A1 | 1/2007 | Rodgers et al. |
| 2007/0019626 A1 | 1/2007 | Lahiri et al. |
| 2007/0038414 A1 | 2/2007 | Rasmussen et al. |
| 2007/0040582 A1 | 2/2007 | Gross et al. |
| 2007/0078635 A1 | 4/2007 | Rasmussen et al. |
| 2007/0136453 A1 | 6/2007 | Ewing et al. |
| 2007/0150215 A1 | 6/2007 | Spitaels et al. |
| 2007/0180117 A1 | 8/2007 | Matsumoto |
| 2007/0240006 A1 | 10/2007 | Fung |
| 2007/0245165 A1 | 10/2007 | Fung |
| 2007/0260897 A1 | 11/2007 | Cochran |
| 2007/0273208 A1 | 11/2007 | Menas et al. |
| 2008/0052145 A1 | 2/2008 | Kaplan et al. |
| 2008/0148075 A1 | 6/2008 | Reder |
| 2008/0170471 A1 | 7/2008 | Rolet et al. |
| 2008/0238404 A1 | 10/2008 | Ferguson |
| 2008/0244281 A1 | 10/2008 | Felter et al. |
| 2008/0247566 A1 | 10/2008 | Mao et al. |
| 2008/0270077 A1 | 10/2008 | Ozonat et al. |
| 2008/0301474 A1 | 12/2008 | Bussa |
| 2008/0317021 A1 | 12/2008 | Ives et al. |
| 2009/0207694 A1 | 8/2009 | Guigne et al. |
| 2009/0234512 A1 | 9/2009 | Ewing et al. |
| 2009/0262604 A1 | 10/2009 | Funada |
| 2012/0133510 A1 | 5/2012 | Pierce et al. |
| 2015/0178401 A1 | 6/2015 | Wilcox, Sr. |
| 2015/0212126 A1 | 7/2015 | Harding |
| 2016/0218934 A1 | 7/2016 | Pierce et al. |
| 2016/0246270 A1 | 8/2016 | Lallement et al. |
| 2016/0284962 A1 | 9/2016 | Harding |
| 2017/0018274 A1 | 1/2017 | German et al. |
| 2018/0013049 A9 | 1/2018 | Harding |
| 2018/0192548 A1 | 7/2018 | Shrivastava et al. |
| 2018/0203718 A1 | 7/2018 | Kia et al. |

FOREIGN PATENT DOCUMENTS

| | | |
|---|---|---|
| EP | 1489719 | 12/2004 |
| EP | 1022583 | 10/2008 |
| FR | 2806473 | 9/2001 |

(56) References Cited

FOREIGN PATENT DOCUMENTS

| GB | 2423168 | 8/2006 |
|---|---|---|
| GB | 2437846 | 11/2007 |
| JP | 05-250188 | 9/1993 |
| JP | 6221649 | 8/1994 |
| JP | 2001337157 | 12/2001 |
| JP | 2003288236 | 10/2003 |
| JP | 2005069892 | 3/2005 |
| JP | 2005198364 | 7/2005 |
| JP | 2005323438 | 11/2005 |
| JP | 2006025474 | 1/2006 |
| JP | 2007139523 | 6/2007 |
| JP | 2007299624 | 11/2007 |
| KR | 101679487 B1 | 11/2016 |
| WO | 2004074983 | 9/2004 |
| WO | 2006/089905 | 8/2006 |
| WO | 2006119248 | 11/2006 |
| WO | 2007021392 | 2/2007 |
| WO | 2007024403 | 3/2007 |
| WO | 2007072458 | 6/2007 |
| WO | 2010048205 | 4/2010 |

OTHER PUBLICATIONS

The International Search Report & Written Opinion, dated Sep. 8, 2008 in PCT/US08/69422. (Previously submitted in U.S. Appl. No. 12/044,530.).
The International Search Report & Written Opinion, dated Apr. 21, 2009 in PCT/US09/36299. (Previously submitted in U.S. Appl. No. 12/044,530.).
The International Search Report & Written Opinion, dated Dec. 18, 2009 in PCT/US09/61354. (Previously submitted in U.S. Appl. No. 12/044,530.).
The International Search Report & Written Opinion, dated Nov. 25, 2009 in PCT/US09/61521. (Previously submitted in U.S. Appl. No. 12/044,530.).
The extended European Search Report by the European Patent Office, dated Jan. 16, 2012, in the corresponding European patent application No. 09716608.6. (Previously submitted in U.S. Appl. No. 12/044,530.).
The extended European Search Report by the European Patent Office, dated Aug. 2, 2012, in the related European patent application No. 09822648.3. (Previously submitted in U.S. Appl. No. 12/044,530.).
Australian Office Action dated Mar. 22, 2013 in related Australian Appl. No. 2008359227. (Previously submitted in U.S. Appl. No. 13/790,601.).
Australian Office Action dated Oct. 9, 2013 in related Australian Appl. No. 2009221803. (Previously submitted in U.S. Appl. No. 13/790,601.).
Chinese Office Action, dated Feb. 16, 2013, in the related CN application No. 200880129788.9. (Previously submitted in U.S. Appl. No. 12/044,530.).
Chinese Office Action, dated Dec. 18, 2013, in the related CN application No. 200880129788.9. (Previously submitted in U.S. Appl. No. 13/790,601.).
Chinese Office Action, dated Jan. 14, 2013, in the related CN application No. 200880131103.4. (Previously submitted in U.S. Appl. No. 12/044,530.).
Chinese Office Action, dated Apr. 26, 2013, in the related CN application No. 200980149075.3. (Previously submitted in U.S. Appl. No. 12/044,530.).
Chinese Office Action, dated Nov. 5, 2012, in the related CN application No. 200980142324.6. (Previously submitted in U.S. Appl. No. 12/044,530.).
Chinese Office Action, dated Dec. 11, 2013, in the related CN application No. 200980142324.6 (Previously submitted in U.S. Appl. No. 13/790,601.).
Japanese Office Action dated Jun. 18, 2013 in the related Japanese application No. 2011-533304. (Previously submitted in U.S. Appl. No. 12/044,530.).

Japanese Office Action dated Aug. 20, 2013 in the related Japanese application No. 2011-532336. (Previously submitted in U.S. Appl. No. 13/790,601.).
Office Actions issued in the parent U.S. Appl. No. 12/044,530.
Office Actions issued in related U.S. Appl. No. 12/112,435.
Office Actions issued in related U.S. Appl. No. 12/168,504.
Office Actions issued in the parent U.S. Appl. No. 12/603,322.
Office Actions issued in related U.S. Appl. No. 12/582,480.
Moore et al., "Weatherman: Automated, online, and predictive thermal mapping and management for data centers," Jan. 1, 2006, Autonomic Computing, 2006. ICAC '06. IEEE International Conference on Dublin, Ireland 13-16, Jun. 2006. (Previously submitted in U.S. Appl. No. 12/044,530.).
Raghavendra et al., "No "Power" Struggles: Coordinated Multi-level Power Management for the Data Center," http://www.hpl.hp.com/echreports/2007/HPL-2007-194.pdf, Mar. 1, 2008. (Previously submitted in U.S. Appl. No. 12/044,530.).
The European Examination Report dated Sep. 4, 2015 in related EP Appl. No. 09716608.6.
The European Search Report dated Jul. 9 and Jul. 6, 2015 in related EP Appl. No. 09822579.0.
The Australian Office Action dated May 11, 2015 in related Australian Appl. No. 2009221803.
The Australian Office Action dated Apr. 11, 2013 in related Australian Appl. No. 2008355732.
The Canadian Office Action, dated May 29, 2015, in related Canadian Application No. 2,722,946.
Office Actions issued in related U.S. Appl. No. 13/790,601.
"Summons to Attend Oral Proceedings Pursuant to Rule 115(1) EPC," Related EPC application No. 9716608.6-1953/2266009, Dated Apr. 10, 2017.
EPO, "Decision to refuse", Application No. 09 716 608.6-1221, dated May 25, 2018.
EPO, "Communication pursuant to Article 94(3) EPC", Application No. 09 822 648.3-1953, dated Aug. 16, 2017.
U.S. Appl. No. 12/044,530, filed Mar. 7, 2008.
U.S. Appl. No. 12/603,322, filed Oct. 21, 2009.
U.S. Appl. No. 13/790,601, filed Mar. 8, 2013.
U.S. Appl. No. 61/106,900, filed Oct. 20, 2008, entitled, "System and Method for Automatic Determination of the Physical Location of Data Center Equipment."
U.S. Appl. No. 61/107,172, filed Oct. 21, 2008, entitled, "Methods of Achieving Cognizant Power Management."
U.S. Appl. No. 12/044,530, filed Mar. 7, 2008, now U.S. Pat. No. 8,671,294, entitled, "Environmentally Cognizant Power Management."
U.S. Appl. No. 12/112,435, filed Apr. 30, 2008, entitled, "System and Method for Efficient Association of a Power Outlet and Device."
U.S. Appl. No. 12/168,504, filed Jul. 7, 2008, entitled, "Automatic Discovery of Physical Connectivity Between Power Outlets and It Equipment."
U.S. Appl. No. 12/582,480, filed Oct. 21, 2009, entitled, "System and Method for Automatic Determination of the Physical Location of Data Center Equipment."
U.S. Appl. No. 12/603,322, filed Oct. 21, 2009, now U.S. Pat. No. 8,429,431, entitled, "Methods of Achieving Cognizant Power Management."
U.S. Appl. No. 13/790,601, filed Mar. 8, 2013, now abaonded, entitled, "Methods of Achieving Cognizant Power Management."
Australian Application No. 2008359227, filed Jul. 8, 2008, entitled, "Automatic discovery of physical connectivity between power outlets and it equipment."
Australian Application No. 2008355732, filed Apr. 30, 2008, entitled, "System and Method for Efficient Association of a Power Outlet And Device."
Australian Application No. 2009308467, filed Oct. 21, 2009, entitled, "Methods of Achieving Cognizant Power Management."
Australian Application No. 2009221803, filed Mar. 6, 2009, entitled, "Environmentally Cognizant Power Management."
Australian Application No. 2009307654, filed Oct. 20, 2009, entitled, "System and Method for Automatic Determination of the Physical Location of Data Center Equipment."

(56) References Cited

OTHER PUBLICATIONS

Canadian Application No. 2,741,088, filed Oct. 21, 2009, entitled, "Methods of Achieving Cognizant Power Management."
Canadian Application No. 2,722,920, filed Apr. 30, 2008, entitled, "System and Method for Efficient Association of a Power Outlet and Device."
Canadian Application No. 2,730,165, filed Jul. 8, 2008, entitled, "Automatic Discovery of Physical Connectivity Between Power Outlets and It Equipment."
Canadian Application No. 2,740,781, filed Oct. 20, 2009, entitled, "System and Method for Automatic Determination of the Physical Location of Data Center Equipment."
Canadian Application No. 2,722,946, filed Mar. 6, 2009, entitled, "Environmentally Cognizant Power Management."
Chinese Patent Application No. 200880129788.9, filed Apr. 30, 2008, entitled, "System and Method for Efficient Association of a Power Outlet and Device."
Chinese Patent Application No. 200880131103.4, filed Jul. 8, 2008, entitled, "Automatic Discovery of Physical Connectivity Between Power Outlets and IT Equipment."
Chinese Patent Application No. 200980149075.3, filed Oct. 21, 2009, entitled, "Methods of Achieving Cognizant Power Management."
Chinese Patent Application No. 200980142324.6, filed on Oct. 20, 2009, entitled, "System and Method for Automatic Determination of the Physical Location of Data Center Equipment."
European Patent Application No. 09716608.6, filed on Mar. 6, 2009, entitled, "Environmentally Cognizant Power Management."
European Patent Application No. 09822648.3, filed on Oct. 21, 2009, entitled, "Methods of Achieving Cognizant Power Management."
European Patent Application No. 08743412.2, filed on Apr. 30, 2008, entitled, "System and Method for Efficient Association of a Power Outlet and Device."
European Patent Application No. 09822648.3, filed on Jul. 8, 2008, entitled, "Automatic Discovery of Physical Connectivity Between Power Outlets and IT Equipment."
European Patent Application No. 09822579.0, filed on Oct. 20, 2009, entitled, "System and Method for Automatic Determination of the Physical Location of Data Center Equipment."
Japanese Application No. 2011-533304, filed on Oct. 21, 2009, entitled, "Methods of Achieving Cognizant Power Management."
Japanese Application No. 2011-532336, filed on Oct. 20, 2009, entitled, "System and Method for Automatic Determination of the Physical Location Of Data Center Equipment."
Japanese Application No. 2011-507383, filed on Apr. 30, 2008, entitled, "System and Method for Efficient Association of a Power Outlet and Device."
Japanese Application No. 2011-517390, filed on Jul. 8, 2008, entitled, "Automatic Discovery of Physical Connectivity Between Power Outlets and It Equipment."
PCT Patent Application No. PCT/US08/05533, filed Apr. 30, 2008, entitled, "System and Method for Efficient Association of a Power Outlet and Device."
PCT Patent Application No. PCT/US08/69422, filed Jul. 8, 2008, entitled, "Automatic Discovery of Physical Connectivity Between Power Outlets and It Quipment."
PCT Patent Application No. PCT/US09/36299, filed Mar. 6, 2009, entitled, "Environmentally Cognizant Power Management."
PCT Patent Application No. PCT/US09/61354, filed Oct. 20, 2009, entitled, "System and Method for Automatic Determination of the Physical Location of Data Center Equipment."
PCT Patent Application No. PCT/US09/61521, filed Oct. 21, 2009, entitled, "Methods of Achieving Cognizant Power Management."

METHODS OF ACHIEVING COGNIZANT POWER MANAGEMENT

CROSS-REFERENCED TO RELATED APPLICATIONS

This application is a continuation of U.S. patent application Ser. No. 13/790,601, filed on Mar. 8, 2013, now abandoned, which is a continuation of U.S. patent application Ser. No. 12/603,322, filed on Oct. 21, 2009, now U.S. Pat. No. 8,429,431, which claims priority from U.S. Provisional Patent Application No. 61/107,172, filed Oct. 21, 2008, and is a continuation-in-part of U.S. patent application Ser. No. 12/044,530, entitled, "Environmentally Cognizant Power Management," filed on Mar. 7, 2008, now U.S. Pat. No. 8,671,294, all of which are assigned to the same assignee, and which are incorporated herein by reference in their entireties.

FIELD OF THE INVENTION

The invention relates to power management. In particular, a system and method is presented for optimizing power management of computational and electrical appliances provisioned in data centers and server installations.

BACKGROUND OF THE INVENTION

Most business organizations today rely on computing power for their business services, including data analysis, supply chain management, inventory tracking, online transactions and customer support. This computing power comes in the form of Web services, Web portals and other open source and proprietary applications hosted in either leased or owned data centers. These data centers use a significant amount of electrical power, both directly through data center computational appliances and indirectly through associated humidity and thermal conditioners. Recent data shows that almost 50% of power delivered to a server farm is spent on cooling infrastructure, while less than 50% is actually utilized in server consumption. The amount of electrical power use during the computational activity inside the server translates into a thermal load. The amount of electric power spent to maintain the operational temperature is also dependent on server air flow characteristics, the relative location of the server hardware within the rack, and other parameters as described later in this disclosure. Even though there is a direct relationship between the computational power utilized by the data centers and supplied electric power, the factors affecting that relationship are many, and the instrumentation and analysis needed to quantify them to the required precision for effective control is challenging. Existing power control mechanisms do not attempt to correlate such utilization with given electrical supply units, and hence fall short of global optimization of the power utilization in data centers and server installations. The above-disclosed related application describes a systematic procedure and apparatus to achieve such monitoring and control using collaborative server computational power measurement and electrical power units consumed under different environmental operational conditions. This related application describes a method to provide the necessary adaptive learning required to address diverse data center server farms and their infrastructure installations. The heuristics used in the method take into account the server hardware, and their associated requirements and locations inside server rack remote locations within the data centers.

While a number of methods are described in the above related application, a class of techniques used in low-level power management but which have not been applied in monitoring and controlling the direct relationship between the computational power utilized by the data centers and supplied electric power are described in the present application. Specifically, techniques for controlling the amount of energy consumption at the motherboard and CPU level may also be used in the monitoring and control of power utilized by servers in data centers Heretofore, such capabilities have been applied in a piecemeal manner primarily to power management in laptop and other mobile systems. There remains a need in the art to apply this technique to systematic way such as described in the above cross-referenced application, to the balance of the computational power utilized by the data centers versus supplied electric power.

BRIEF SUMMARY OF THE INVENTION

A system and method of increasing the efficiency of overall power utilization in data centers by integrating a power management approach based on a comprehensive, dynamic model of the data center created with integrated environmental and computational power monitoring to correlate power usage with different configurations of business services utilization with the techniques of CPU level power management

BRIEF DESCRIPTION OF THE DRAWINGS

For a better understanding of the present invention, reference is made to the following description and accompanying drawings, while the scope of the invention is set forth in the appended claims:

DETAILED DESCRIPTION OF THE INVENTION

Figure 1:
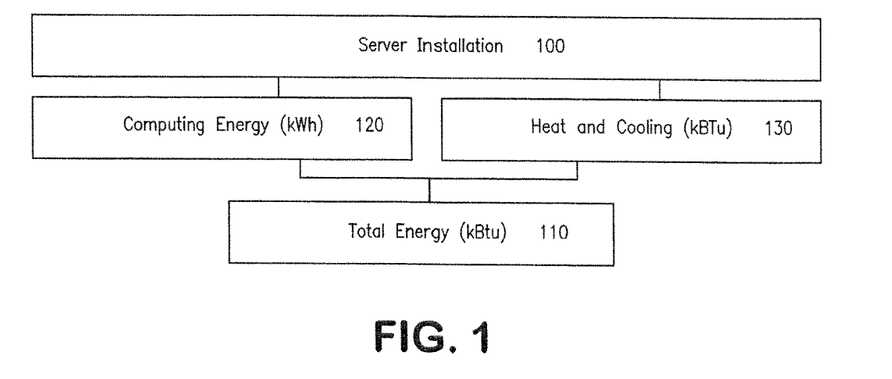
FIG. 1 illustrates major categories of energy consumption.

FIG. 1 depicts the major sections of energy consumption in server installations 100. Total energy 110 is a summation of the power used for computational purposes 120 and the power used for heating and cooling functions 130. Environmentally based power management uses these major consumption areas to minimize the total energy usage in an adaptive manner. The iterative analysis begins by computing the initial measure of total electrical power consumed by the server and network hardware configuration from the asset information. The assets denote the electrical and computing units in the infrastructure and cover, for example, servers, routers, switches, cooling units, racks, sensors and power distribution panels. This base computation is then supplemented by the electrical power delivered to the cooling and other infrastructure elements. This electrical side power consumption is tracked against the computational power consumed by business services and correlated with real time electrical metering at the server level. The asset information and other configuration information can either be supplied directly to the power management system or imported from existing IT management systems, which is common in an enterprise level installation. The environmentally conscious power management system and method of the present invention increases the efficiency of overall power utilization by using coordinated power monitoring at the electrical power distribution side as well as in the consumption side of server installations using simplified common management interfaces (e.g. simple network management protocol (SNMP) web services) for environmental and server monitoring. The system and method improves the efficiency of power utilization per computational unit and provides policies for dynamic load allocation capabilities based on application loads and environmental contexts, e.g. rack configurations, cooling units and thermal characteristics of the data center room. The dynamic computational load balancing policies of the present invention can be adopted by (i) positioning the servers at environmentally optimized locations, (ii) scheduling the computational tasks at physically diverse locations, and (iii) providing VMOTION (utility for migration of virtual machines between physical servers offered by VMWARE) in the virtual environments leveraging virtualization technology. The proposed approach addresses modifications needed to measure the electrical power requirements in such virtualization environments.

A coordinated framework is the most important ingredient to maximize the benefits of information gathered by the environmental and server measuring agents denoted as monitors in the figures illustrated herewith. Practices address local electrical optimization which might not accurately determine the total requirements. In an environment where multiple business services are consolidated at the server level, they might help to reduce the power consumed at each individual server. However they do not account for the operating conditions and thus become ineffective in situations where those conditions are significant, such as when the servers are configured in a dense arrangement like server blades. In addition to consolidating multiple business services into a single or few servers for minimizing power consumption, it is also important to determine the optimum location of that server hardware based on the environmental context. For example, an application running on a server with a rack mounted cooling unit would likely use less overall power than the same application running on an identical server in a less efficient cooling environment. Similarly, an application running on a server with a low-power hard drive would likely use less power than the same application running on a server with large power consumption or inefficient heat dissipation design. The selection of servers for load balancing is mostly ad hoc under current practices and does not detailed analysis.

The most important challenge in power management is the lack of components to correlate the computational processing power related to services and electrical power consumption with the accuracy needed for globally optimized load-balancing and control. In addition to the challenges needed to monitor a single location environment, IT in today's enterprises are typically located at geographically distant locations for better utilization of human, time and material resources. These geographic variables are not taken into account in present electrical power operational profiles due to the lack of a comprehensive solution to address such capabilities. As business services are rendered for multiple geospatial locations, it is critical to include coordination among electrical power management and computational processing operations at the enterprise level within the global context of business services. The optimization of overall power utilization thus does require a coordinated framework, systematic procedure and control elements to distribute the business computing load both at the physical location and logical locations (as applications and server clusters or virtual machines) by configurable and adaptive monitoring and continuous analysis of the environment for global power management decisions.

The server monitoring tools and appliances employ either agent or non-agent based technologies to measure application load, starting with determining the number of instances of each application running on each server, using different mechanisms primarily depending on the operating systems hosted in server hardware. Typical monitoring interfaces available for monitoring and measurement include Windows management instrumentation (WMI) on Microsoft platforms, simple network management protocol (SNMP), and Web service management (WS-MAN). The granularity of the information necessary to associate the application loads of the electrical power used is not directly computable from the standard interfaces. Thus it is useful to obtain the right metrics from these existing base metrics that are usable in electrical power computations. The environmentally-based power management framework addresses this constraint by aggregating the process level information from different mechanisms (including network computer monitoring devices such as Raritan's COMMAND CENTER NOC, baseboard management controller such as Raritan's KIRA, and power environmental monitoring devices such as Raritan DOMINION PX) to improve the accuracy of the predicted electrical power unit consumption based on environmental factors, server hardware characteristics, operating system overheads and running application to provide business services. As shown below, a first level of power metrics is obtained from server hardware and power supply units installed within the servers and a second level of power metrics is obtained from operating system and applications executed within the servers. A third level of metrics is computed from the live monitoring of actual business utilization, configuration, topology, thermal activity and electrical power usage.

Another constraint in the power management operations that the server monitoring instrumentation and electrical environment monitoring instrumentation are installed separately and maintained independently, thus making calibration and coordination of these measurements relatively difficult. The environmentally cognizant power management system and method integrates both server and environmental monitoring and provides cooperative collection and processing of metrics, thus improving the scope of optimization at the global level. In order to improve the interoperability of measurement devices and distributed data collection, a common information model (CIM) is proposed, and management interfaces that support this CIM profiles are recommended. Intelligent platform management interface (IPMI) is one such standard and Raritan Baseboard Management Controller (KIRA) and DOMINION PX are a few examples of monitoring and management devices that support the Intelligent Platform management Interface (IPMI) interface making it suitable for power optimization applications.

The environmentally cognizant power management framework also applies to both virtual and physical server environments. In particular, virtualization technology provides dynamic load balancing operations that help simplify collaborative power management. As described later, the proposed approach can be adopted to a physical server installations as well as virtual server installations.

In addition to the instrumentation necessary to collect a server computational power metrics and electrical power measurements at desired interfaces during programmed intervals, the synchronization of this information needs to be clearly determined for accurate correlation of events and submission of both utilization supply. The management controller and power optimization (330) system of FIG. 3 supports the necessary components to order and group the data set collected over multiple interfaces to various time intervals. The information required to compute the long-term trending is different from localized short bursts of measurements. In such cases, the management controller configures the necessary data collection devices to collect the measurements at different sampling intervals between maintenance cycles as necessary.

Figure 2:
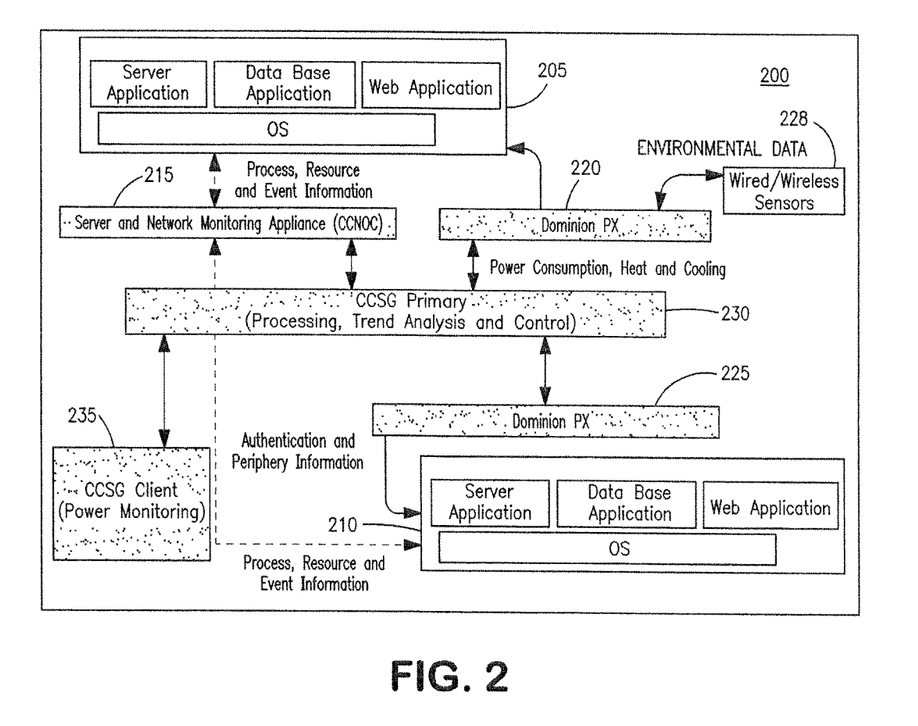
FIG. 2 is an exemplary architecture for power management in a server farm or data center environment according to the present invention.

Referring now to FIG. 2, there is shown a system 200 that uses coordinated power management server installations, data centers and other such constructs. System 200 includes servers 205 and 210 that are connected to a management and monitoring device 215. Servers 205 and 210 may be any computing device in any hardware and software configuration that may include for example, server applications, database applications, web applications and the operating system that hosted business applications. Management and monitoring device 215 may be Raritan's Command Center NOC or any other similar device. Servers 205 and 210 are also connected to power management devices 220 and 225, respectively. Power management devices 220 and 225 may be Raritan's DOMINION PX or any other intelligent power management device. Management and monitoring device 215 and power management devices 225 are further coupled to a monitoring control and analysis device 230 that is accessible to the user by a client interface 235.

The environmentally cognizant power management system and method uses the above management components as building blocks for power management framework. In particular, the management and monitoring device 215 determines in real-time the operating system and applications running a server. In addition, the management and monitoring devices 215 determines and real-time the operating system and applications monitoring on each server. In addition, the management and monitoring devices 215 monitor server hardware parameters using a Baseboard Management Controller's hardware that may be available as embedded modules or parts, such as for example, in Raritan's KIRA device. These parameters, including the power cycle events and CPU temperatures, provide an additional level of power metrics to correlate to the CPU utilization and the computational load created by the business applications. Power management devices 220 and 225 gather information of electric power used by each connected device as well as environmental data (primarily temperature, air flow and humidity) by wired and wireless sensor devices. This environmental monitoring integration grows as the energy requirements at the cooling units to the computing load and ambient conditions. The computational affects electric power draw which creates thermal energy which in turn affects the electrical power consumed by the cooling supply. The ambient conditions within the data centers affect the efficiency of cooling units, thus necessitating the need for including the localization parameters into the dynamic model of the data center. The external ambient conditions also impact the energy needs to operate cooling and condenser units at the desired operating temperatures and are preferably incorporated into the model as well.

The interaction of these components and power optimization is detailed in FIG. 2. In this scenario, the business applications are distributed according to operating profiles computed by the centralized processing engine (main controller) running in control and analysis device 230. That is, business applications are scheduled to be executed at a particular server based on its efficiency and power and thermal profiles and its position within the rack, location within the server room or facility, as well as environmental conditions. The processing logic in device 230 gathers environmental conditions from the environmental sensors which are coupled to a common monitor (or integrated into power management devices 220 and 225) and the measurement of electric power usage that are directly available from power management devices 220 and 225. To derive the optimized operating profile for the IT services heuristically by 230, the framework takes into account the following:

First, the current draw and efficiency of the power supply units which convert alternating current (AC) power into direct current (DC) power used inside the server hardware. This information is acquired from the configuration management database (CMDB.), known as asset data in IT terminology. The asset information includes the nameplate data that describes the maximum power drawn by the hardware and the inlet and outlet temperatures necessary for proper operating conditions based on its physical design and functional characteristics. In addition to the component level information, the physical location of the racks, the relative distance of servers from the cooling systems and orientation of racks are also fed into the system either from the CMDB, if available, or from other data sources.

Second, the base level power requirements for the operating systems and applications running on servers. This is dependent on the utilization of central processing unit or CPU, random access memory, hard disk, and other resources in addition to the operating system implementation. This information is typically imported from the IT infrastructure systems or automatically collected through the Baseboard Management Controller (BMC).

Third, the actual utilization of business computing services within the environmental and chronological context. These process level metrics are obtained by monitoring appliance 215 through WMI and SNMP interfaces at periodic intervals as computed from the main controller.

In order to improve the accuracy of correlating electrical power requirements with the information from various appliances, the measurement data are synchronized to a clock server that runs inside device 230. The sequencing operation of the measurement data acquired from any device is validated based on the time of arrival of the relative event occurrences before storage for further processing. In addition to the synchronization capabilities, the Web services capability automates the discovery and communication between the information provider services and the processing engine which runs in device 230. Before the start of monitoring and data collection, all measurement devices must be discovered and properly registered in order to successfully interpret the events with its context. The context of the operating conditions is important to the measurement. For example, the electrical power usage of computer room air conditioner (CRAG) units in a lightly loaded environment is to be treated differently from the measurement of highly loaded operating conditions. The data received throughout the entire system is thus interpreted within the operational context of the global level. The monitor data are now accessible to receivers, which, in the usual scenario, are provided in the main controller in the system. If there is a failure to receive data from one device or multiple devices, the management controller adapts the next level metrics or derived metrics from previous context or earlier data acquisition until the system is back to normal operation. The standard interface of using Web services fit well into scalable reconfigurable enterprise platform and the proposed approach can be easily adopted into its existing infrastructure. The prior art power management for information technology services does not provide the capabilities of coordinated operations over the network and thus cannot benefit from load-balancing across infrastructure and computational equipment in power utilization. The inventive system and method address this constraint by provisioning network aware services in each appliance. This facilitates real-time synchronization between different units in the migration processing across multiple units. A network enabled Web services technology supports both reactive and proactive power monitoring, which is valuable to complex environments where the behavior of applications and short term failures or irreparable crashes. Web services can provide configuration updates and enable reconfiguration by subscription methods between peer-to-peer systems, which in the present case are the data measurement devices and data receivers for processing the data.

Where the power (and hence cooling) is of critical importance, server level power monitoring is highly beneficial for information technology management, specifically for auditing, capacity planning, thermal assessment, and performance improvement. These scenarios essentially require power usage and active monitoring on servers to determine the need for rescheduling the load based on predefined and/or dynamic power policies. The dynamic power management policies are either stored in the system or referred from an external network management system. Basic level of power profiles are supported at the operating system level and advanced configuration and power interface (ACPI) provides a way to control this aspect. The proposed approach applies to any power profiles including ACPI and uses appropriate metrics for different kinds of profiles. Current power policies that utilized ACPI focus on reliable power feed to the computing units based on the availability of electrical power from alternate sources like uninterruptible power supply generators.

Figure 3:
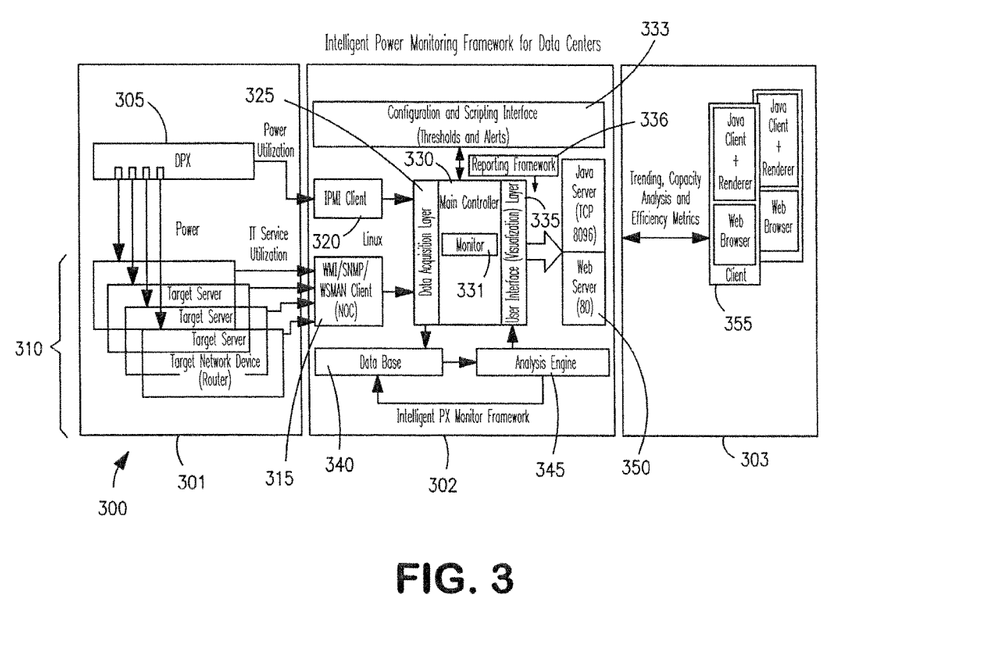
FIG. 3 is an exemplary framework related to the architecture shown in FIG. 2.

Referring now to FIG. 3, there is shown a framework of an intelligent power monitoring system 300 for server farms or data centers in accordance with the invention. In a first phase 301, system 300 includes a power management appliance 305 that acts as a power distribution unit (PDU) to target servers 310 and enables users to measure power at the outlet level, providing an accurate view of power consumption at a target server 310 or a PDU level (total power distributed). Most of the existing power distribution units measure rack level or branch circuit level power measurements, which might not be sufficient for power monitoring at the server level. In a second phase 302, management and monitoring device 315 collects IT service utilization information from target servers 310 using WMI, SNMP or WS-MAN client interfaces and feeds it to a data application layer 325 of a monitor 331. In addition, an IPMI client interface 320 gathers information from power management appliances 305 and feeds it to the data acquisition layer 325. This is the orthogonal metric and provides the assessment of maximum, minimum and average electrical consumption. Monitor 331 is also coupled to a configuration and scripting interface 333 that inputs threshold and alerts to the monitor 331. In this description, the monitor refers to the software component that is responsible for monitoring the measurements from the devices obtaining server—side metrics (e.g. operating systems, CPU temperature, application instances) as well as those obtaining the electrical side metrics (e.g. power usage, temperature, air flow and humidity). This is the data interface layer of the system, and is configurable from the main controller 330. Main controller 330 can define the polling interval, event receiving mechanisms and device topology and interface for communication.

Data acquisition layer 325 in turn feeds it to a database 340. Database 340 is coupled in a feedback arrangement with an analysis engine 345, which applies processed information for user interface (visualization and interaction) layer 335 that is coupled to an application server or Web server 350. In a third phase 303, the application server or Web server 350 exchanges the processed information, which includes trend analysis, capacity analysis and efficiency metrics, with a Java client or Web browser 355 at the client side.

The reporting and publishing logic of this framework includes two kinds of information dissemination to either the form of alerts or reports for energy audits. As depicted in FIG. 3, the derived metrics from the framework range from capacity data collection 336 to estimates based on rigorous optimization. The reporting of the output of the analysis engine 345 can provide data center efficiency metrics including individual server efficiency and relation to the applications that are running in the data center and the environmental context. The output also provides a service that the base model of data center power utilization for tracking the trend and adaptive learning. These outputs can be used to optimize power consumption taking into account the desired business services, server hardware and software characteristics and the data center environment parameters, including cooling and ventilating facilities. The strength of this framework is a configurable power monitoring logic and retrieval of IT business service dependencies based on heuristic analysis.

Figure 4:
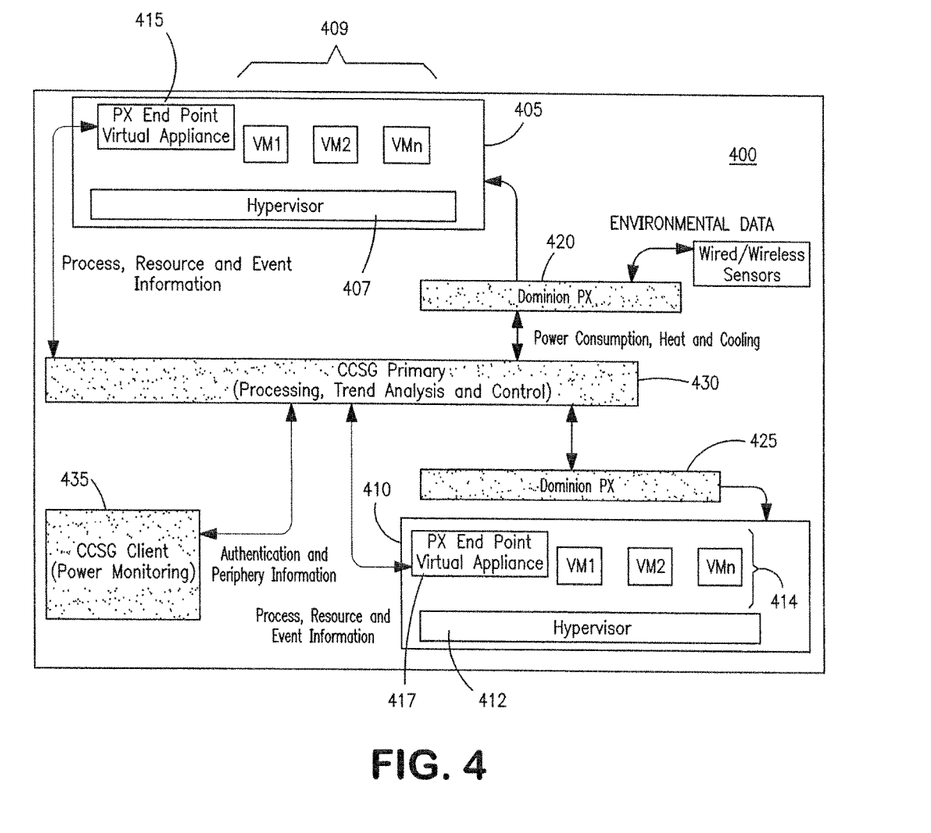
FIG. 4 is an exemplary architecture for power management in a virtual machine environment according to the present invention.

Referring now to FIG. 4, there is shown a system 400 that uses coordinated power management in a virtual machine implementation. System 400 includes servers 405 and 410 that are coupled to a control and analysis device 430 that is accessible by a user via a client interface 435. Servers 405 and 410 may be computing devices that implement a virtual machine environment such as VMWARE or XEN. In an exemplary embodiment, a provider 407 (412) manages a plurality of virtual machines 409 (414). Servers 405 and 410 are also connected with power management devices 420 and 425, respectively. Each server 405 (410) has a respective power management endpoint appliance 415 (417) that monitors all the running processes (computer power) and their resource utilization at the application level in terms of memory, disk and network usage. This is achieved by monitoring the hypervisor APIs supplied by the virtualization server for hardware resources. Device 430 collects this information from devices 405 and 410 and additional information from devices 420 and 425.

In both scenarios illustrated in FIGS. 2 and 4, an energy consumption metric is normalized to the power required to operate the core services like operating systems, network, memory, storage and infrastructure. In an exemplary embodiment, application load may be distributed intelligently among the different physical and logical bins to minimize the total electrical power utilization in terms of computing and cooling.

Figure 5:
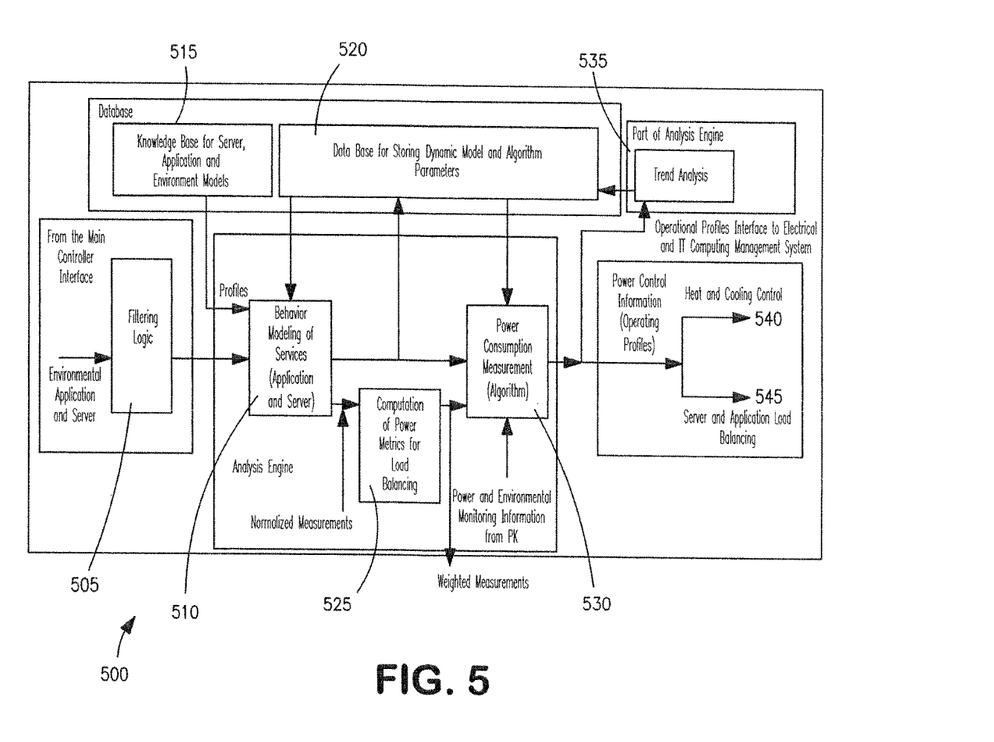
FIG. 5 is an exemplary top level flowchart of a method according to the present invention.

The data driven framework facilitates monitoring and provides interface for dynamic control of electrical and computing power management. This method reduces the cost of equivalent computing power needed by providing the basis for an optimal distribution of total computing load needed by the business at any given time. In general, FIG. 5 shows the stages involved in the power optimization method, which analyzes the present operating conditions in the services context to compute the operational computing and electric power profiles for effective electric power utilization for any given computing load. Decision rules may be established according to the criticality of business services, which is configurable by the IT administrators and infrastructure providers. For example, the administrator could decide to place an absolute limit on the aggregate rate of power consumption in the data center and identify certain applications whose execution is to be deferred if the power consumption limit has been met. The output of the stage will be delivered to the control logic stage that allocates the application of it among the service in order to minimize total power utilization.

Referring specifically to FIG. 5, a top-level flowchart of the inventive method is shown. Environmental, application server power data is input to a filter 505. Since the volume of data to be collected through device 230 in FIG. 2 and device 430 in FIG. 4 is quite large, filter 505 is preferably implemented at the front end of device 230 (430). Filter 505 provides the capability to prioritize information related to electrical power consumption to compute the CPU power metrics that are adequate to correlate with the power data received from, for example, devices 220 and 225 in FIG. 2. The filter supplies the short-term details as well as the long-term trends from the data collected across many end nodes and aggregation devices. The CPU usage, main memory, disk I/O, and the CPU time slice shared among many virtual machines are examples of metrics that have major impact on the electrical power consumption on that server hardware. A function of the filter 505 is to accumulate such resource utilization into a representation that facilitates mapping between the computational load and electrical power. In a smaller data center with especially low level of complexity, the filter may not be required, and the resource utilization information be used as is.

Filtered data is then input into behavior modeling module 510. Workload or business service characterization is performed in advance for common business services and common server platforms to create basic model for data center power usage. This is stored in knowledge base 515, providing a second input to module 510. The base modeling of combined characteristics of server and application combinations also helps to reduce the data needed to process the electrical power utilization at any given time of server operation. The workload characteristics were normalized to the hardware parameters acquired from the asset database. A third input to module 510 is database 520 which provides the current dynamic model information in parameters.

Module 510 sends database 520 the information about the current datacenter configuration and computational loads which is used to update the database if necessary. The current state information is also passed to power metric computation module 525 which uses it to compute the power usage and environmental metrics (e.g. ambient temperature) predicted by the dynamic model. The power consumption measure module 530 gets information about the existing distribution of application loads among the various servers from module 510 and also gets predicted power and environment metrics from module 525. Module 530 acquires information on the actual electrical power and thermal and other environmental conditions to the monitoring inputs from, for example, devices 220 and 225 in a time adjusted and correlated manner. If the predicted data is within defined tolerance limits of the actual data, the dynamic model is validated. If not, the information is output to a trend analysis module 535 which provides feedback for updating and refining the dynamic model and algorithm parameters in database 520.

As a final step, the dynamic model is applied to the current application to determine if a reallocation of that load among the servers is required for power usage optimization. Given the models to predict power usage based on the application of common environmental factors and server hardware and software characteristics, there are numerous methods for making that determination known in the art. For example, a simple approach would be to rank order the servers based on the predicted incremental power draw for an increment of computational load under existing environmental conditions and rank order the applications based on the anticipated schedule of computational load. Starting with the application with a large load this process would allocate instances of the applications first to the most efficient server and, as a server's maximum computational load was reached, proceeding to the next most efficient server until done. This approach will yield reasonable results and has the advantage of being simple and fast, it will often result in a sub optimal allocation. A better approach of the preferred embodiment develops heuristic rules using a process similar to the back propagation learning algorithms used in neural networks. Neural networks are similar to artificial intelligence methods, trying to model the human learning and intelligence using computer algorithms with a set of neurons and interconnections between themselves based on the learning. In the event that the analysis concludes that a reallocation of application loads or adjustment to the environmental condition infrastructure is required, appropriate instructions are sent to 1) heating and cooling control 540 and 2) server and application load balance control 545 in order to implement the desired changes.

In general the major components in the framework for mining the environment for energy conservation include the main controller, monitor, database and analysis engine. The amount of data collected through monitor engine may become unmanageably large and may not be fully utilized for energy data collection. The framework provides an intelligent configuration module that adapts the customer environment after initial run and facilitates capture and analysis of only selected but relevant information pertaining to the electrical and computing energy calculations. The framework is adapted to collect the measurements at the necessary intervals with precision and sampling rate. This module is designed in such a way that the business services and its impact are easily supplemented to the acquisition and analysis logic. The overall framework either includes logic to gather asset information of the environment or could be integrated to an external repository. This information is used in the heuristic information for adaptively tracking the association between the electrical and computing power entities. The framework gathers the services and the infrastructure either through the dynamic learning or through a static import. This information is then used as the base for analysis of the services in addition to the typical environment behavior. This increases efficiency in terms of deployment effort and automated learning thereafter. The synchronization of all individual components in the framework is configurable to an internal time server or to an external network time service.

The approach described creates global profiles for electrical and computing utilization by systematic processing of power metrics collected using multiple mechanisms for configuration and characterization of various power utilization heuristics. The operational profiles specify the amount of computing load at each server, the location of the server to the host that the computing load and the electrical units delivered to the cooling unit on required schedules. The method models energy consumption at the process level to maximize the accuracy of power optimization across the entire environment. The Web services-based approach works well for distributed enterprises where the communication framework is extended hierarchically through multiple levels of aggregation control to gather the dynamic load conditions and load-balancing operations at locations remote from the central power management system.

It is understood that FIG. 5 is illustrative only and that other program entry and exit points, timeout functions, error checking routines and the like (not shown) would normally be implemented in a typical system software. It is also understood that the system software can be implemented to run continuously in an embedded system. Accordingly, start blocks and end blocks are intended to indicate logical beginning and ending points of a portion of code that can be integrated into the main program and called as needed to support continuous system operation. Implementation of these aspects of the invention is readily apparent and well within the grasp of those skilled in the art based on the disclosure herein.

Although an exemplary network environment as described above, in the network of interconnected computers, servers, applications and other devices are applicable and can be used with respect to the method described above. Computers commonly operate in a networked environment using logical connections to one or more computers. The computers used in conjunction with the method may be a personal computer, a server, a router, a network PC, a peer device or other common network node, and typically includes many or all of the elements described above. The connections include but are not limited to local area network (LAN), wide area network (WAN) and other such networking environments that are commonplace in offices, enterprise wide computer networks, intranets, and the Internet. It will be appreciated that the network connections shown are exemplary and other means of establishing communications links between the computers may be used. The purpose of illustration, programs and other executable program components such as the operating system are illustrated herein as discrete blocks, although it is recognized that such programs and components reside at various times in different storage components of the computer, and are executed by the data processor(s) of the computer. Different combinations of hardware and software can be used to carry out the teachings of the present invention. The computer or computing device typically includes a processor. The processor typically includes a CPU such as a microprocessor. A CPU generally includes an arithmetic logic unit ALU which performs arithmetic and logical operations, and a control unit, which extracts instructions (e.g. code) from memory and decodes and executes them, calling on the ALU as necessary. Memory as used herein refers to one or more memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including a processor. Memory preferably stores a computer program, e.g., code or sequence of instructions being operable by a processor.

As previously noted, in the event that analysis concludes that a reallocation of application loads or an adjustment to the environmental conditioning infrastructure is required, appropriate instructions are sent to 1) heating and cooling control 540 and 2) server and application load balancing control 545 in order to implement the desired changes. APCI enabled Hardware and operating systems allow another method of reducing energy costs via efficient energy consumption. Specifically, techniques for controlling the amount of energy consumption at the device, motherboard, chip set and CPU level may also be used in addition to steps 540 and 545 referred to above. Many technology companies are implementing compliance with ACPI As noted above, ACPI is the current open standard for implementing power management at the processor level. ACPI is, at its most basic, a method for describing hardware interfaces in terms abstract enough to allow flexible hardware implementations while allowing shrink-wrap OS code to use such hardware interfaces. Operating System-directed Power Management (OSPM) is a model of power (and system) management in which the OS plays a central role and uses global information to optimize system behavior for the task at hand. ACPI Hardware is computer hardware with the features necessary to support OSPM and with the interfaces to those features described using the ACPI Description Tables.

The operating system interacts with ACPI hardware by selecting various ACPI defined states—a mode of operation of either a system, processor or device which defines certain behaviors of the system, process or device. An incomplete list of states is found below. These various states are for described in, for example, Advanced Configuration and Power Interface Specification (Revision 3.0b Oct. 10, 2006).

Global System States which represent an entire system state which is visible to use, and divided into four states G0, G1, G2, G3;

Sleeping States residing within global system state G1 (except for S5) and divided into five states S1, S2, S3, S4, S5;

Device Power states usually invisible to the user divided into four states—D0, D1, D2, and D3 and which vary with each device;

CPU Power states also known as CPU sleep states which reside within the global system state G) and are divided into five states C0, C1, C2, C3, and C4;

CPU/Device Performance states which control CPU/Device power management when it is still active, including usually clock speed and voltage variance depending on workload, and which will have a CPI dependent number of states; and CPU Thermal Monitor which throttles the CPU to a low performance state when temperature exceeds a threshold, wherein TM1 throttling is done by changing the duty cycle and in TM2, throttling is done by changing the clock speed or core voltage (P state).

For purposes of power management and determining the amount of electrical power used by a CPU or device, obviously establishing a G1 state or sleeping state is useful, with S1-S4 determining wake up latency of 2 seconds to 30 seconds. Further, various CPU power states (C-states) also allow useful methods to have an operating system regulate power at the CPU levels. C states are processor power consumption and thermal management states. The C0 state is baseline—the processor in this state executes instructions. The C1 state has the lowest latency. The hardware latency in this state must be low enough that the operating software does not consider the latency aspect of the state when deciding whether to use it. Aside from putting the processor in a non-executing power state, this state has no other software-visible effects. This is done in actual execution by using the assembly instruction "halt" with a wake-up time having an order of magnitude of 10 ns. The C2 state offers improved power savings over the C1 state. The worst-case hardware latency for this state is provided via the ACPI system firmware and the operating software can use this information to determine when the C1 state should be used instead of the C2 state. The transition time from C-2 to C-0 is on the order of magnitude of 100 nanoseconds, and the processes achieved on a processor level by gating the processor core clock and platform I/O buffers . . . . Aside from putting the processor in a non-executing power state, this state has no other software-visible effects. The C3 state offers improved power savings over the C1 and C2 states. In the C-3 state, the bus clock and PLLs are dated. Wakeup time is preferably on the order of 50 μs. The worst-case hardware latency for this state is provided via the ACPI system firmware and the operating software can use this information to determine when the C2 state should be used instead of the C3 state. While in the C3 state, the processor's caches maintain state but ignore any snoops. The operating software is responsible for ensuring that the caches maintain coherency.

Even further, Device and Processor Performance states (Px states) are power consumption and capability states within the active/executing state C0 and D0. The Px states are briefly defined as follows. P0—While a device or processor is in this state, it uses its maximum performance capability and may consume maximum power. P1—In this performance power state, the performance capability of a device or processor is limited below its maximum and consumes less than maximum power. Pn—In this performance state, the performance capability of a device or processor is at its minimum level and consumes minimal power while remaining in an active state. State n is a maximum number and is processor or device dependent.

The P-states can be achieved by dynamic voltage scaling and dynamic frequency scaling. Dynamic voltage scaling is a power management technique in computer architecture, where the voltage used in a component is increased or decreased, depending upon circumstances. Reducing the voltage means increasing program runtime while reducing power consumption. Dynamic frequency scaling (also known as CPU throttling) is a technique in computer architecture where a processor is run at a less-than-maximum frequency in order to conserve power.

In this technique of dynamic voltage and frequency scaling (DVFS), the CPU core voltage, clock rate, or both, can be altered to decrease power consumption at the price of potential performance. This can be used to optimize the power-performance trade-off. DVFS technology includes dynamic voltage scaling and dynamic frequency scaling. Dynamic voltage scaling is a power management technique in computer architecture, where the voltage used in a component is increased or decreased depending on circumstances. Dynamic voltage scaling to decrease voltage is known as undervoltage. MOSFET-based digital circuits operate using voltages at circuit nodes to represent logical states. The voltage at these nodes switches between a high-voltage and a low voltage during normal operation-when the inputs to a logic gate transition, the transistors making up that gate toggle the gate's output. At each node in a circuit is a certain amount of capacitance. This capacitance arises from various sources, mainly transistors through a capacitance of diffusion capacitance and wires coupling capacitance. Toggling a voltage at a circuit node requires charging or discharging the capacitance in that node. Since capacitance is related to voltage, the time that the node takes depends on the voltage applied. By applying a higher voltage to device a circuit, the capacitance is higher and discharges more quickly, resulting in a faster operation of the circuit and outing for a higher frequency operation. A switching power dissipated by a chip using static CMOS gates is determined by the equation $C*V^2*f$, where C is the capacitance being switched per clock cycle, V is the voltage and f is the switching frequency. While this formula is not exact, as modern chips are not implemented using only CMOS technology, it does show that overall power consumption decreases with voltage. Accordingly, dynamic voltage scaling is widely used as part of strategies to manage switching power consumption in battery-powered devices such as cell phones and laptop computers. Low voltage modes are used in conjunction with lower clock frequencies to minimize power consumption associated with such as CPUs and DSPs. Only when significant computational power is needed both voltage and frequency be raised. Note that many peripherals also support low-voltage operational modes. Please note that reducing the voltage means that circuit switch is slower, producing the maximum frequency at which that's circuit can run. This in turn, reduces the rate at which program instructions can be issued, which may increase runtime for program segments which are succeeded significantly CPU-bound. Thus there is a complex trade-off between power management and computational load. Also note that the efficiency of some logical components, such as the regulators, decreases with increasing temperature, so the power use may increase with temperature. Since increasing power use may increase the temperature, increasing the voltage or frequency may also increase system power demands even faster than the above CMOS formula indicates.

Dynamic frequency scaling is a technique where processors run at a less than maximum frequency in order to conserve power. Again, the efficiency of some electrical components, such as the voltage regulators, decreases with increasing temperature, so the power use may increase with temperature. Since increasing power use may increase the temperature, increases in voltage or frequency may increase a system power demand even further than the CMOS formula indicates and vice versa.

Note that each of the above techniques, there is a reinforcing effect, where the production of either voltage or frequency applied to the CPU as whole or functional units within the CPU also reduces the amount of heat generated by the CPU or its components. As such, less cooling is the necessary for the motherboard, further reducing overall system energy consumption.

The above described techniques are well known in the art of power management for laptops and other such devices. These techniques have been caught codified in a number of ways, again most prominently the Advanced Configuration and Power Interface (ACPI). ACPI is an open industry specification within an established industry. Implementation of these aspects of the invention is readily apparent and well within the grasp of those skilled in the art based on the disclosure herein.

In one embodiment of the present invention, servers 205 and 210 a FIG. 2 include ACPI hardware and firmware to allow compliance with ACPI standards, and operating systems that are OSPM capable. FIG. 5, a top-level flowchart of one method of the present invention as previously discussed, also includes dynamic frequency and voltage scaling control. The particulars of any set of available states among a heterogeneous collection of CPUs within a server and/or among a set of servers such as servers 210 and 215 are included in the knowledgebase 515, which shall update module 510 to allow algorithms of power metric computation module 525 and power consumption management module 530 to incorporate this information for enhanced power optimizations. Note that these added dimensions of CPU state will increase the computational complexity of these algorithms. In operation, an application such as the analysis engine shown in FIG. 5 will issue an APCI call to an operating system to change the CPU state. This operating system may then either call on a server such as server 210 or 215 or a hypervisor such as hypervisor 407 or 412. The hypervisor then interfaces with the hardware to cause the CPU state change.

In another embodiment of the present invention, the analysis engine shown in FIG. 5 may issue requests for changes to APCI state in any of a plurality of devices, central processing units, motherboards, or any other APCI compliant hardware.

While the foregoing description and drawings represent the preferred embodiments of the present invention, it will be understood that various changes and modifications may be made without departing from the spirit and scope of the present invention.

What is claimed is:

1. A method for cognizant power management in a distributed computing system including a computing device, servers, power supply units and cooling units, comprising the steps of:
    gathering, by the computing device, values for electrical power metrics from the servers and power supply units, the electrical power metrics characterizing electrical power usage in the computing environment;
    gathering, by the computing device, values for computational power metrics from operating systems and applications executed within the servers, the computational power metrics characterizing a distribution of a computational load among the servers;
    gathering, by the computing device, values for environmental metrics from environmental monitoring devices in the computing environment, the environmental metrics characterizing environmental conditions in the computing environment;
    generating, by the computing device, a predictive behavior power utilization model based on the values of the electrical power metrics, the computational power metrics and the environmental metrics for the computing system, the predictive behavior power utilization model effective to predict values of electrical power metrics and environmental metrics as a function of the values of the computational power metrics;
    distributing, by the computing device, an application load to the distributed computing system;
    gathering, by the computing device, values for the computational power metrics associated with the application load;
    applying, by the computing device, the predictive behavior power utilization model to predict values for the electrical power metrics and the environmental metrics under the application load;
    gathering, by the computing device, values of the actual electrical power metrics and the actual environmental metrics under the application load;
    updating, by the computing device, the predictive behavior power utilization model when the predicted values for the electrical power metrics and the environmental conditions fall outside defined tolerance limits for the actual electrical power metrics and environmental conditions; and
    reallocating, by the computing device, the application load by executing an optimization step whereby the application load is reallocated to minimize a value of total electrical power utilization by the servers, power supply units and cooling units as determined by values of the electrical power metrics and environmental metrics predicted by the updated dynamic model as a function of computational power metrics associated with the reallocated application load.

2. The method of claim 1, wherein the servers include at least one of a plurality of central processing units, a plurality of functional units within central processing units, and a plurality of hypervisors managing virtual machines.

3. The method of claim 2, further comprising the step of:
    setting a state in at least one of the servers based on the predictive behavior power utilization model before carrying out the distributing step, wherein the state is one of a plurality of performance states.

4. The method of claim 3, wherein setting one of a plurality of performance states includes changing the frequency of a processing unit.

5. The method of claim 3, wherein setting one of a plurality of performance states includes changing the voltage of a processing unit.

6. The method of claim 3, wherein setting one of a plurality of performance states includes changing the frequency and the voltage of a processing unit.

7. The method of claim 3, wherein one of a plurality of performance states includes at least a first performance state and a second performance state, wherein the first performance state can bear a greater computational load than the second state.

8. The method of claim 3, wherein the state is one of a plurality of sleep states.

9. The method of claim 8, wherein the plurality of sleep states includes at least a first sleep state and second sleep state, wherein the first sleep state has a lower wake up time than the second sleep state.

* * * * *